US010468658B2

(12) United States Patent
Choo et al.

(10) Patent No.: US 10,468,658 B2
(45) Date of Patent: Nov. 5, 2019

(54) RECHARGEABLE BATTERY HAVING CASE

(71) Applicant: Samsung SDI Co., Ltd., Yongin-si, Gyeonggi-do (KR)

(72) Inventors: Seong-Gi Choo, Yongin-si (KR); Sung-Hwa Eo, Yongin-si (KR); Da-Woon Han, Yongin-si (KR); Jan-Dee Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 249 days.

(21) Appl. No.: 15/226,817

(22) Filed: Aug. 2, 2016

(65) Prior Publication Data

US 2017/0117530 A1 Apr. 27, 2017

(30) Foreign Application Priority Data

Oct. 23, 2015 (KR) ........................ 10-2015-0148213

(51) Int. Cl.

| | |
|---|---|
| ***H01M 2/02*** | (2006.01) |
| ***H01M 2/26*** | (2006.01) |
| ***H01M 2/30*** | (2006.01) |
| ***H01M 10/04*** | (2006.01) |
| ***B60R 16/033*** | (2006.01) |
| ***H01M 2/06*** | (2006.01) |
| ***H01M 10/0587*** | (2010.01) |

(52) U.S. Cl.

CPC ........... *H01M 2/305* (2013.01); *B60R 16/033* (2013.01); *H01M 2/021* (2013.01); *H01M 2/024* (2013.01); *H01M 2/0212* (2013.01); *H01M 2/06* (2013.01); *H01M 2/263* (2013.01); *H01M 10/0413* (2013.01); *H01M 10/0587* (2013.01); *H01M 10/0431* (2013.01); *H01M 2220/20* (2013.01)

(58) Field of Classification Search

CPC ........ H01M 2/024; H01M 2/06; H01M 2/305; H01M 2/263; H01M 2220/20; B06R 16/033

See application file for complete search history.

(56) References Cited

U.S. PATENT DOCUMENTS

| | | | | |
|---|---|---|---|---|
| 2006/0046137 A1* | 3/2006 | Kodama | H01M 2/08 | 429/129 |
| 2006/0166088 A1* | 7/2006 | Hokanson | A61N 1/378 | 429/161 |
| 2009/0169990 A1* | 7/2009 | Gardner | H01M 2/30 | 429/179 |
| 2010/0081042 A1* | 4/2010 | Morishima | H01M 2/263 | 429/94 |
| 2010/0124694 A1* | 5/2010 | Hikata | B26F 1/384 | 429/94 |
| 2011/0067227 A1* | 3/2011 | Sohn | H01M 2/22 | 29/623.1 |
| 2011/0244287 A1 | 10/2011 | Kim et al. | | |
| 2012/0177981 A1 | 7/2012 | Kim | | |

FOREIGN PATENT DOCUMENTS

| | | | |
|---|---|---|---|
| JP | 2005-209529 | * | 8/2005 |
| JP | 2011-070916 | * | 4/2011 |
| JP | 2013-218819 | A | 10/2013 |
| KR | 10-2010-0061317 | A | 6/2010 |
| KR | 10-2012-0081783 | A | 7/2012 |

OTHER PUBLICATIONS

Machine translation of JP 2011-070916, published on Apr. 7, 2011 (Year: 2011).*

Machine translation of JP 2005-209529, published on Aug. 4, 2005 (Year: 2005).*

Ruan, C., Diao, K., Chen, H., Zhou, Y., Zhang, L.—Thermal Modelling and Effects of Electrode Configuration on Thermal Behaviour of a LiFePO4 Battery, Proceedings of the FISITA 2012 World Automotive Congress, pp. 765-777, published online on Nov. 7, 2012 (Year: 2012).*

* cited by examiner

*Primary Examiner* — Anca Eoff

(74) *Attorney, Agent, or Firm* — Knobbe Martens Olson & Bear LLP

(57) ABSTRACT

A rechargeable battery is disclosed. In one aspect, the battery includes an electrode assembly having a thickness and including a positive electrode and a negative electrode. The battery also includes a case accommodating the electrode assembly. The electrode assembly further includes a plurality of first electrode tabs protruding from the positive electrode and a plurality of second electrode tabs protruding from the negative electrode. The first electrode tabs have a width and are aligned in the thickness dimension of the electrode assembly. A distance TG between the first electrode tabs and the second electrode tabs satisfies the following equations: $1.2TW1<TG<6TW1$ and $TG>5SW1$, where TW1 is the width of the first electrode tabs and SW1 is the minimum distance between the first electrode tabs and a lateral end of the electrode assembly.

18 Claims, 6 Drawing Sheets

RECHARGEABLE BATTERY HAVING CASE

CROSS-REFERENCE TO RELATED APPLICATION

This application claims priority to and the benefit of Korean Patent Application No. 10-2015-0148213 filed in the Korean Intellectual Property Office on Oct. 23, 2015, the entire contents of which are incorporated herein by reference.

BACKGROUND

Field

The described technology is generally related to a rechargeable battery having a case.

Description of the Related Technology

A rechargeable battery can be repeatedly charged and discharged unlike a primary battery that cannot be recharged. A low capacity rechargeable battery is used for a portable small electronic device such as a mobile phone, a laptop computer, and a camcorder. A higher capacity rechargeable battery must be used for a motor driving power source of a hybrid vehicle and the like.

Recently, a high power rechargeable battery using a non-aqueous electrolyte having a high energy density has been in development. The battery is configured by serially coupling a plurality of rechargeable batteries for driving a motor of a device that requires a high power, e.g., an electric vehicle.

Further, one high capacity rechargeable battery typically includes multiple rechargeable battery cells coupled together. The rechargeable battery can be manufactured with a cylindrical shape, an angular shape, or the like.

A rechargeable battery generates heat while being charged and discharged. For example, a large amount of heat is generated during a high C-rate discharge. Heat is largely generated in a region having high resistance, and particularly, a large amount of heat is generated by contact resistance from an uncoated region and the region to which current collecting portions are connected.

The above information disclosed in this Background section is only for enhancement of understanding of the background of the invention and therefore it can contain information that does not constitute the prior art that is already known in this country to a person of ordinary skill in the art.

SUMMARY OF CERTAIN INVENTIVE ASPECTS

One inventive aspect relates to a rechargeable battery including electrode tabs that are spaced apart.

Another aspect is a rechargeable battery that can reduce heat generated during a high C-rate discharge.

Another aspect is a rechargeable battery that includes an electrode assembly including a positive electrode and a negative electrode, and a case configured to include an accommodating portion into which the electrode assembly is inserted, wherein the electrode assembly includes a plurality of first electrode tabs protruded from the positive electrode and a plurality of second electrode tabs protruded from the negative electrode, and a distance TG between the first electrode tabs and the second electrode tabs can satisfy following equations:

$1.2TW1<TG<6TW1$ and $TG>5SW1$, wherein a width of the first electrode tabs is designated by TW1 and a minimum distance between the first electrode tabs and a lateral end of the electrode assembly is designated by SW1.

Further, when a width of the second electrode tabs is designated by TW2, and a minimum distance between the second electrode tabs and the lateral end of the electrode assembly is designated by SW2, the width AW of the electrode assembly can satisfy a following equation:

$$AW=SW1+TW1+TG+TW2+SW2.$$

The minimum distance SW1 between the first electrode tabs and the lateral end of the electrode assembly can satisfy a following equation:

$$\tfrac{1}{20}TW1<SW1<\tfrac{3}{4}TW1.$$

The first electrode tabs and the second electrode tabs can be protruded to an identical direction, and the width of the first electrode tabs can be greater than the width of the second electrode tabs.

The width of the first electrodes can be from about 1.1 times to about 1.5 times greater than the width of the second electrode tabs, and the rechargeable battery can serve to start an engine.

Further, the electrode assembly can be configured to have a spirally wound structure in which a separator is interposed between the positive electrode and the negative electrode, and the first electrode tabs and the second electrode tabs can be disposed to face a first surface of a virtual reference plane that passes through a center of the electrode assembly in a thickness direction.

The first electrode tabs and the second electrode tabs can be biasedly disposed in different directions with respect to the center of the electrode assembly in the thickness direction, and the first electrode tabs can be disposed to face a first surface of the virtual reference plane that passes through the center of the electrode assembly in the thickness direction, and the second electrode tabs can be disposed to face a second surface of the virtual reference plane.

Another aspect is a rechargeable battery comprising: an electrode assembly having a thickness and comprising a positive electrode and a negative electrode; and a case accommodating the electrode assembly, wherein the electrode assembly further comprises a plurality of first electrode tabs protruding from the positive electrode and a plurality of second electrode tabs protruding from the negative electrode, wherein the first electrode tabs have a width and are aligned in the thickness dimension of the electrode assembly, and wherein a distance TG between the first electrode tabs and the second electrode tabs satisfies the following equations:

$$1.2TW1<TG<6TW1 \text{ and } TG>5SW1,$$

where TW1 is the width of the first electrode tabs and SW1 is the minimum distance between the first electrode tabs and a lateral end of the electrode assembly.

In the above rechargeable battery, the width AW of the electrode assembly satisfies the following equation:

$$Aw=Sw1+TW1+TG+TW2+Sw2,$$

where TW2 is the width of the second electrode tabs and SW2 is the minimum distance between the second electrode tabs and the lateral end of the electrode assembly.

In the above rechargeable battery, the minimum distance SW1 between the first electrode tabs and the lateral end of the electrode assembly satisfies the following equation:

$$(\tfrac{1}{20})*TW1<SW1<(\tfrac{3}{4})*TW1.$$

In the above rechargeable battery, the first and second electrode tabs protrude in the same direction.

In the above rechargeable battery, the width of the first electrode tabs is greater than the width of the second electrode tabs.

In the above rechargeable battery, the width of the first electrodes is from about 1.1 times to about 1.5 times greater than the width of the second electrode tabs.

In the above rechargeable battery, the rechargeable battery is configured to start an engine.

In the above rechargeable battery, the electrode assembly has a spirally wound structure in which a separator is interposed between the positive and negative electrodes.

In the above rechargeable battery, the first and second electrode tabs face a first surface of a virtual reference plane that passes through a center of the electrode assembly in a thickness direction.

In the above rechargeable battery, the first and the second electrode tabs are disposed in different directions with respect to the center of the electrode assembly in a thickness direction.

In the above rechargeable battery, the first electrode tabs face the first surface of a virtual reference plane that passes through the center of the electrode assembly in the thickness direction, wherein the second electrode tabs face a second surface of the virtual reference plane.

Another aspect is a rechargeable battery comprising: an electrode assembly comprising a positive electrode, a negative electrode, a plurality of first electrode tabs protruding from the positive electrode, and a plurality of second electrode tabs protruding from the negative electrode, wherein a distance (TG) between the first electrode tabs and the second electrode tabs satisfies the following equation:

$$1.2TW1<TG<6TW1$$

where TW1 is the width of the first electrode tabs and SW1 is the minimum distance between the first electrode tabs and a lateral end of the electrode assembly.

In the above rechargeable battery, the distance (TG) satisfies the equation:

$$TG>5SW1.$$

In the above rechargeable battery, the first and second electrode tabs have the same width.

In the above rechargeable battery, the first electrode tabs are wider than the second electrode tabs.

In the above rechargeable battery, the first electrode tabs are located closer to a front surface of the rechargeable battery than the second electrode tabs.

The above rechargeable battery further comprises a case accommodating the electrode assembly.

In the above rechargeable battery, the width (AW) of the electrode assembly satisfies the equation, AW=SW1+TW1+TG+TW2+SW2, where TW2 is the width of the second electrode tabs and SW2 is the minimum distance between the second electrode tabs and the lateral end of the electrode assembly.

Another aspect is a rechargeable battery comprising: an electrode assembly comprising a positive electrode, a negative electrode, a plurality of first electrode tabs protruding from the positive electrode, and a plurality of second electrode tabs protruding from the negative electrode, wherein a width (TG) between the first electrode tabs and the second electrode tabs satisfies the following equation:

$$1.2TW1<TG<6TW1$$

where TW1 is the width of the first electrode tabs and SW1 is the minimum distance between the first electrode tabs and a lateral end of the electrode assembly, wherein the first electrode tabs are wider than the second electrode tabs.

In the above rechargeable battery, the width of the first electrodes is from about 1.1 times to about 1.5 times greater than the width of the second electrode tabs.

According to at least one of the disclosed embodiments, heat generated at the electrode tab can be minimized.

DETAILED DESCRIPTION OF CERTAIN INVENTIVE EMBODIMENTS

Figure 1:
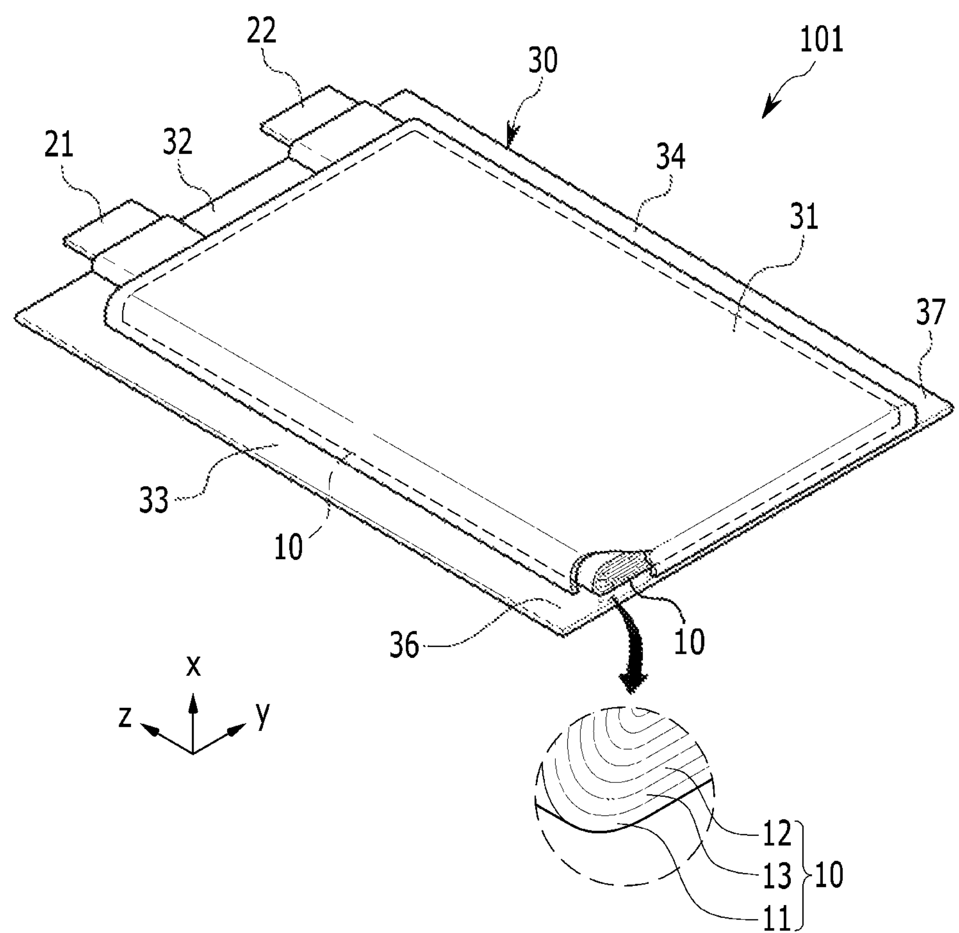
FIG. 1 is a perspective view illustrating a rechargeable battery according to a first exemplary embodiment of the described technology.

Hereinafter, the described technology will be described in detail with reference to the accompanying drawings, in which exemplary embodiments of the described technology are shown. However, as those skilled in the art would realize the described embodiments can be modified in various different ways, all without departing from the spirit or scope of the described technology. Also, same reference numerals designate the same elements throughout the present specification and drawing.

Figure 2:
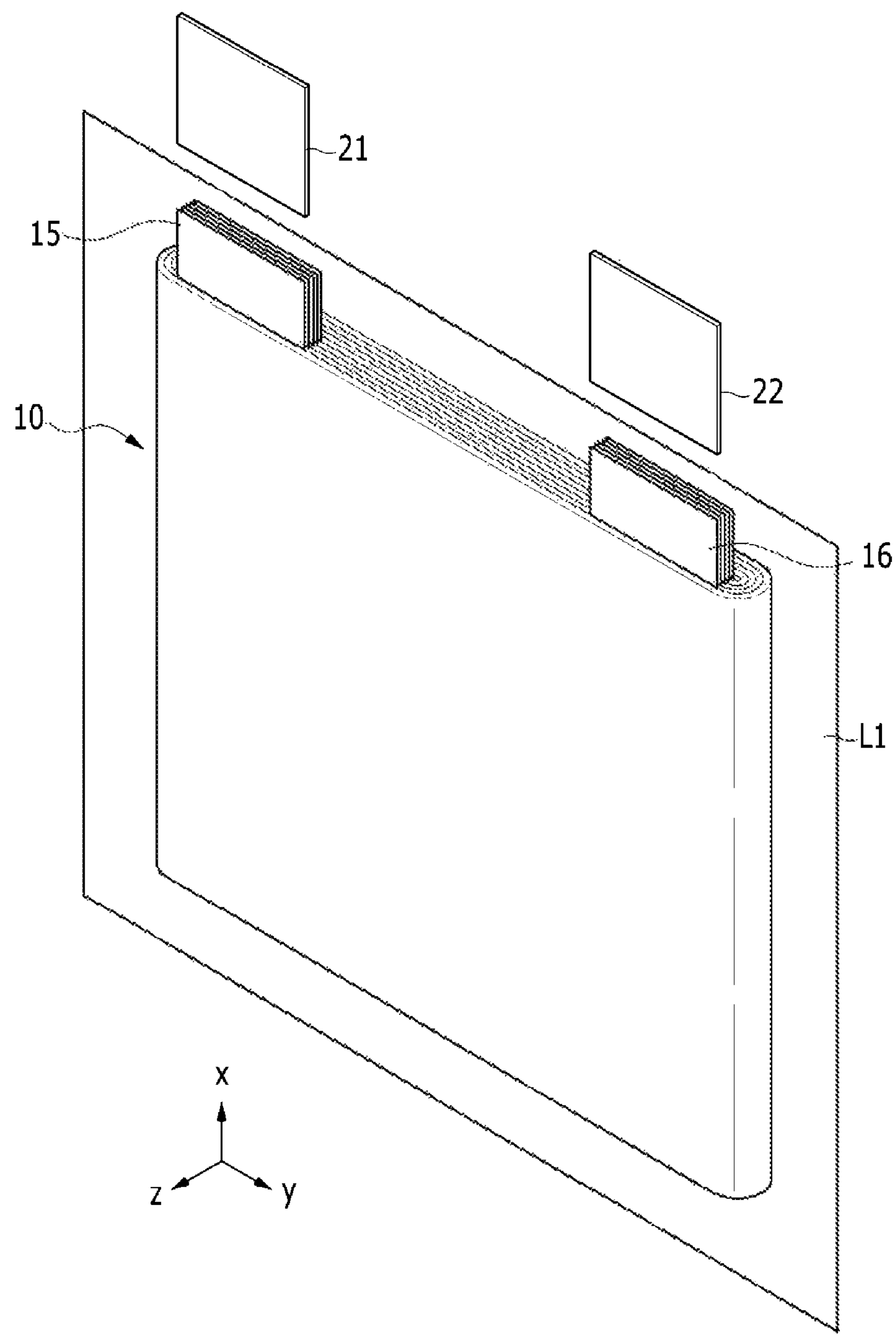
FIG. 2 is an exploded perspective view illustrating an electrode assembly and a lead tab of the rechargeable battery according to the first exemplary embodiment of the described technology.

FIG. 1 is a perspective view illustrating a rechargeable battery 101 according to a first exemplary embodiment of the described technology. FIG. 2 is an exploded perspective view illustrating an electrode assembly and a lead tab of the rechargeable battery according to the first exemplary embodiment of the described technology.

Referring to FIG. 1 and FIG. 2, the rechargeable battery 101 includes the electrode assembly 10 configured to perform charging and discharging, a case 30 accommodating the electrode assembly 10, and a first lead tab 21 and a second lead tab 22 that are electrically connected to the electrode assembly 10 and protrudes outwardly from the case 30.

The rechargeable battery 101 can start an engine and be discharged at a discharge rate (C-rate) of about 30 C to about 50 C. Herein, "C" indicates a charge and discharge rate.

The electrode assembly 10 includes a positive electrode 11, a negative electrode 12, and a separator 13 interposed between the positive electrode 11 and the negative electrode 12. The positive electrode 11 includes a positive electrode current collector formed of a strip-shaped metal thin plate, and a positive electrode active material layer coated on one surface or opposite surfaces of the positive electrode current collector. The positive electrode current collector can be formed of a metallic material having excellent conductivity, for example, an aluminum thin plate. The positive electrode active material layer includes activated carbon for high C-rate discharging.

The negative electrode 12 can include a negative electrode current collector formed of a strip-shaped metal thin plate, and a negative electrode active material layer coated on one surface or opposite surfaces of the negative electrode current collector. The negative electrode current collector can be formed of the metallic material having excellent conductivity, for example, a copper thin plate. The negative electrode active material layer can include amorphous carbon for high C-rate discharging.

The separator 13 can be formed of a porous material, and can be formed of polyolefin, polyethylene, polypropylene, or the like. The electrode assembly 10 can have a spirally wound structure in which the separator 13 is interposed between the positive electrode 11 and the negative electrode 12.

The positive electrode 11 includes a plurality of first electrode tabs 15 that protrude upwardly from the electrode assembly 10. The first electrode tabs 15 can be integrally formed with the positive electrode current collector. The first electrode tabs 15 can be formed by a punching process, and upwardly protrude from the electrode assembly 10.

Figure 3:
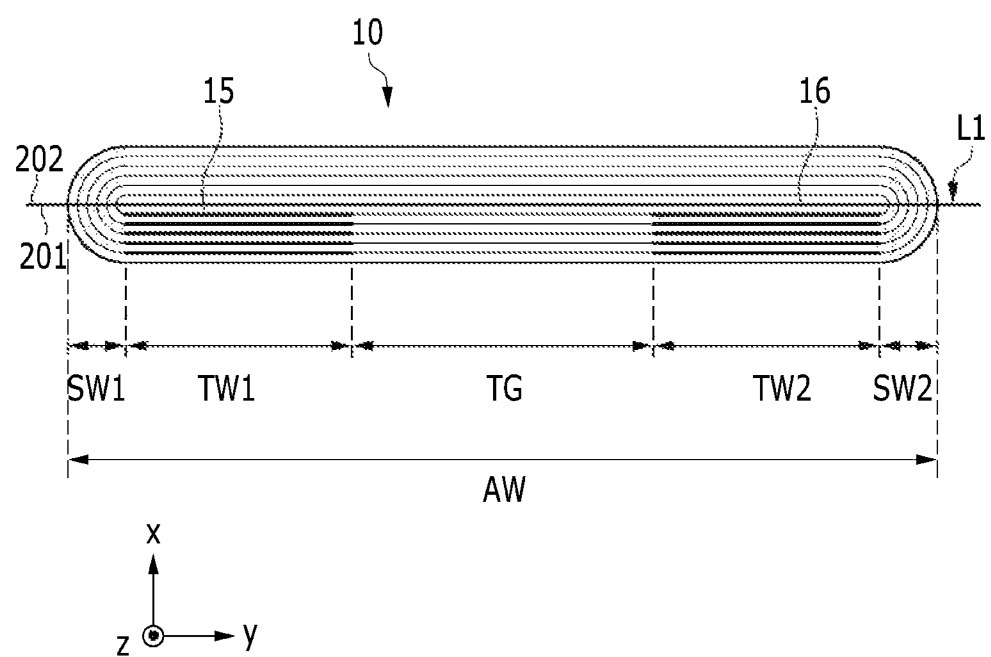
FIG. 3 is a top plan view illustrating the electrode assembly according to the first exemplary embodiment of the described technology.

In some embodiments, the first electrode tabs 15 are biasedly disposed in a side with respect to a center of the electrode assembly 10 in a thickness direction (direction of x-axis in FIG. 3). For example, as shown in FIG. 3, the first electrode tabs 15 are disposed to face only a first surface 201 of a virtual reference plane L1 that passes through the center of the electrode assembly 10 in the thickness direction.

The negative electrode 12 includes a plurality of second electrode tabs 16 that protruding in the same direction (direction of z-axis in FIG. 2) as the first electrode tabs 15. The second electrode tabs 16 can be integrally formed with the negative electrode current collector, and formed by the punching process.

In some embodiments, the second electrode tabs 16 are biasedly disposed in the side with respect to the center of the electrode assembly 10 in the thickness direction (direction of x-axis in FIG. 3). The second electrode tabs 16 can be biasedly disposed in the same direction to that of the first electrode tabs 15. In some embodiments, as shown in FIG. 3, the second electrode tabs 16 are disposed to face only the first surface 201 of the virtual reference plane L1 that passes through the center of the electrode assembly 10 in the thickness direction. For example, none of the first and second electrode tabs 15 and 16 is disposed to face a second surface 202 of the virtual reference plane L1.

The first lead tab 21 can be welded to the first electrode tabs 15, and the second lead tab 22 can be welded to the second electrode tabs 16. The first and second lead tabs 21 and 22 protrude outwardly from the case 30.

The case 30 can have a pouch shape and includes an accommodating portion 31 into which the electrode assembly 10 is inserted, and edge portions 32, 33, and 34 that are formed on an outside of the accommodating portion 31 and are adhered thereto for sealing. The first lead tab 21 and the second lead tab 22 are configured to extend through one edge portion 32.

Figure 4:
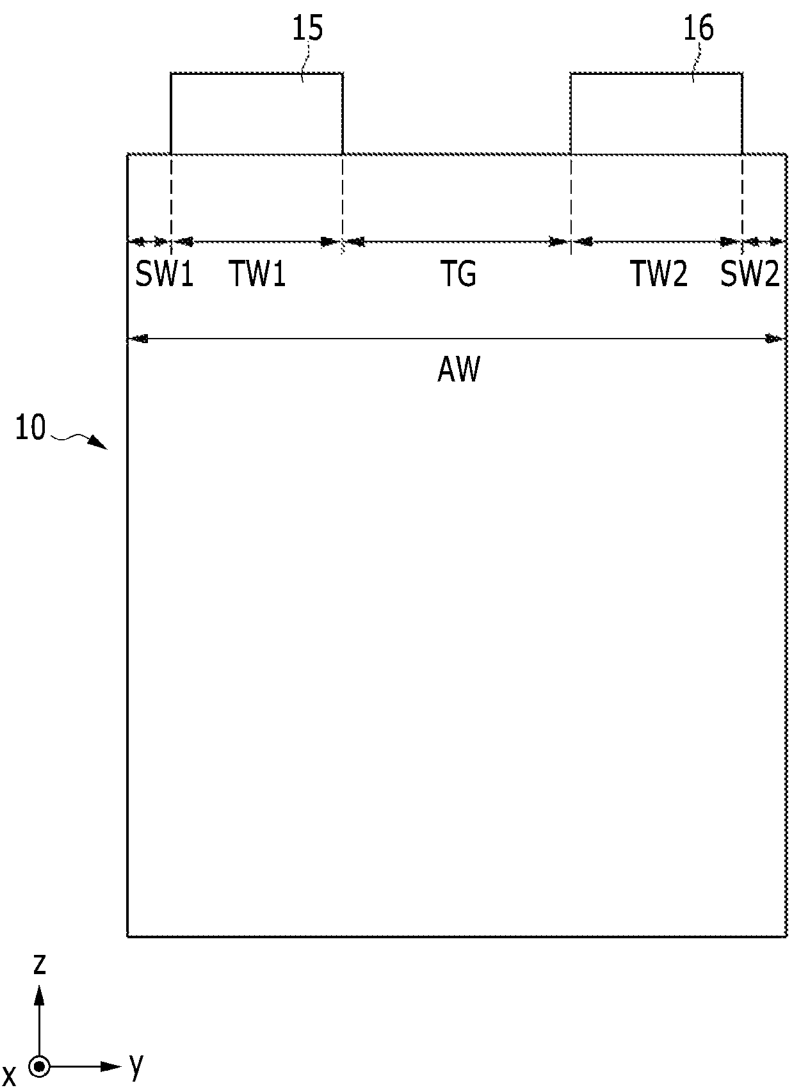
FIG. 4 is a front view illustrating the electrode assembly according to the first exemplary embodiment of the described technology.

FIG. 3 is a top plan view illustrating the electrode assembly 10 according to the first exemplary embodiment of the described technology. FIG. 4 is a front view illustrating the electrode assembly according to the first exemplary embodiment of the described technology.

Referring to FIG. 3 and FIG. 4, when a width of the first electrode tabs 15 is designated by TW1, a width of the second electrode tabs 16 is designated by TW2, a minimum distance between the first electrode tabs 15 and a lateral end of the electrode assembly 10 is designated by SW1, and a minimum distance between the second electrode tabs 16 and the lateral end of the electrode assembly 10 is designated by SW2, a distance TG between the first electrode tabs 15 and the second electrode tabs 16 satisfies following Equation 1.

$$1.2TW1<TG<6TW1,\ TG>5SW1 \qquad \text{Equation 1}$$

In some embodiments, the width TW1 of the first electrode tabs 15 is the same as the width TW2 of the second electrode tabs 16, and the minimum distance SW1 between the first electrode tabs 15 and the lateral end of the electrode assembly 10 is the same as the minimum distance SW2 between the second electrode tabs 16 and the lateral end of the electrode assembly 10. Herein, a width AW of the electrode assembly 10 is evaluated by SW1+TW1+TG+TW2+SW2.

In the case that the rechargeable battery is discharged at a high discharge rate, e.g., about 20 C to about 30 C, a large amount of heat can be generated at the first electrode tabs 15 and the second electrode tabs 16. For example, a larger amount of heat is generated at the first electrode tabs 15 that are connected to the positive electrode. The above range can provide an optimum balance between prevention of heat generation and the distance between the first and second electrode tabs 15 and 16. However, the discharge rate can be less than about 20 C or greater than about 30 C.

In some embodiments, the distance between the first electrode tabs 15 and the second electrode tabs 16 is maintained at an appropriate level. If the distance TG between the first electrode tabs 15 and the second electrode tabs 16 is less than about 1.2 times of the width TW1 of the first electrode tabs 15, heat may not appropriately emitted, so an excessive amount of heat can be generated at the first electrode tabs 15 and the second electrode tabs 16.

Further, if the distance TG between the first electrode tabs 15 and the second electrode tabs 16 is greater than about 6 times of the width TW1 of the first electrode tabs 15, the width TW1 of the first electrode tabs 15 can be too narrow, so the first electrode tabs 15 can be overheated.

A gap for sealing is formed between the first electrode tabs 15 and the lateral end of the electrode assembly 10, and the distance TG between the first electrode tabs 15 and the second electrode tabs 16 can be formed to be greater than about 6 times of the minimum distance SW1 between the first electrode tabs 15 and the lateral end of the electrode assembly 10.

Further, the minimum distance SW1 between the first electrode tabs 15 and the lateral end of the electrode assembly 10 satisfies following Equation 2.

$$(1/20)*TW1<SW1<(3/4)*TW1 \qquad \text{Equation 2}$$

Thus, according to the present exemplary embodiment, heat generated at the first electrode tabs 15 and the second electrode tabs 16 can be minimized by securing a sufficient distance between the first electrode tabs 15 and the second electrode tabs 16, while appropriately securing the width TW1 of the first electrode tabs 15.

Figure 5:
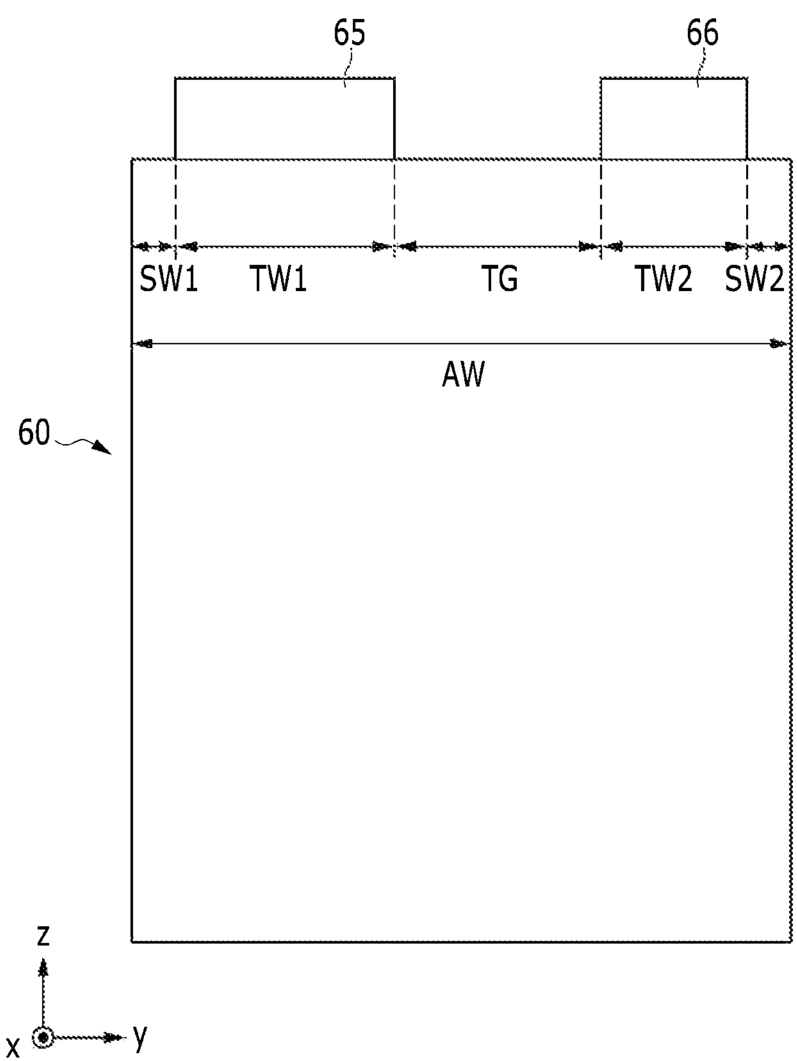
FIG. 5 is a front view illustrating the electrode assembly according to a second exemplary embodiment of the described technology.

FIG. 5 is a front view illustrating an electrode assembly 60 according to a second exemplary embodiment of the described technology.

Referring to FIG. 5, the electrode assembly 60 has the same structure as that of the electrode assembly 60 according to the above-described first exemplary embodiment except for structures of first electrode tabs 65 and second electrode tabs 66, so duplicated descriptions will be omitted.

The width TW1 of the first electrode tabs 65 can be formed to be greater than the width TW2 of the second electrode tabs 66. For example, the width TW1 of the first electrode tabs 65 is greater than from about 1.1 times to about 1.5 times of the width TW2 of the second electrode tabs 66. Since the largest amount of heat is generated at the first electrode tabs 65 connected to the positive electrode during the high C-rate discharge, when the width of the first electrode tabs 65 is formed to be greater than the width of the second electrode tabs 66, it is possible to prevent excessive heat generated at the first electrode tabs 65, and it is also possible to maintain temperatures of the first electrode tabs 65 and the second electrode tabs 66 at a similar level.

Meanwhile, when a width of the first electrode tabs 65 is designated by TW1, a width of the second electrode tabs 66 is designated by TW2, the minimum distance between the first electrode tabs 65 and a lateral end of the electrode assembly 60 is designated by SW1, and the minimum distance between the second electrode tabs 66 and the lateral end of the electrode assembly 60 is designated by SW2, a distance TG between the first electrode tabs 65 and the second electrode tabs 66 satisfies following Equation 1.

$$1.2TW1<TG<6TW1,\ TG>5SW1 \qquad \text{Equation 1}$$

Further, the minimum distance SW1 between the first electrode tabs 65 and the lateral end of the electrode assembly 60 satisfies following Equation 2.

$$(1/20)*TW1<SW1<(3/4)*TW1 \qquad \text{Equation 2}$$

Thus, according to the second exemplary embodiment, heat generated at the first electrode tabs 65 and the second electrode tabs 66 can be minimized by securing the sufficient distance between the first electrode tabs 65 and the second electrode tabs 66, while appropriately securing the width TW1 of the first electrode tabs 65.

Figure 6:
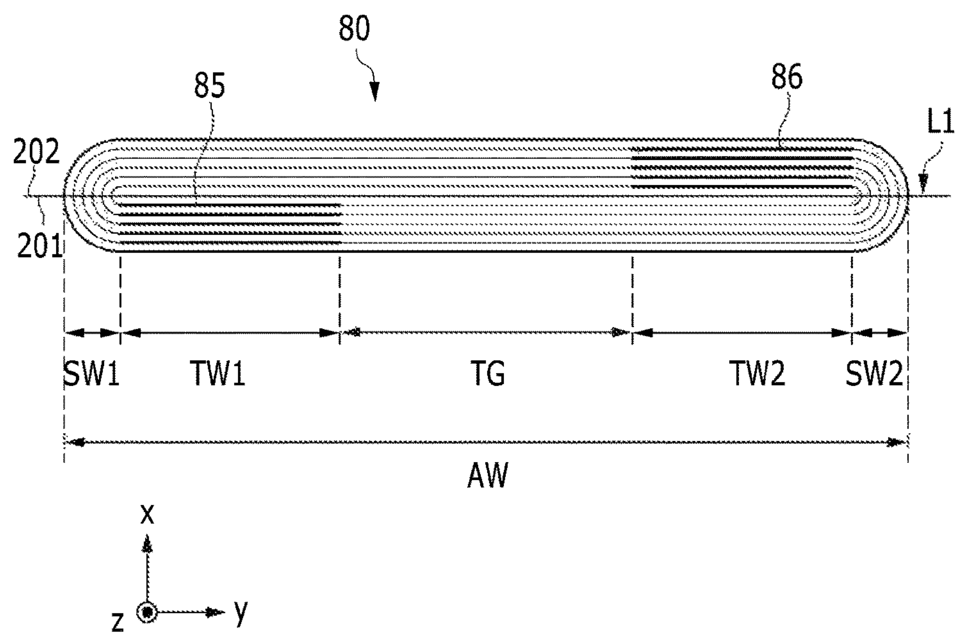
FIG. 6 is a top plan view illustrating the electrode assembly according to a third exemplary embodiment of the described technology.

FIG. 6 is a top plan view illustrating an electrode assembly 80 according to a third exemplary embodiment of the described technology.

Referring to FIG. 6, the electrode assembly 80 has the same structure to that of the electrode assembly 80 according to the above-described first exemplary embodiment except for structures of first electrode tabs 85 and second electrode tabs 86, so duplicated descriptions will be omitted.

In some embodiments, the first electrode tabs 85 are biasedly disposed in the first side with respect to a center of the electrode assembly 80 in the thickness direction (direction of x-axis in FIG. 3). For example, the first electrode tabs 85 are disposed to face only the first surface 201 of the virtual reference plane $L_1$ that passes through the center of the electrode assembly 80 in the thickness direction.

The second electrode tabs 86 can be biasedly disposed in a second side with respect to the center of the electrode assembly 80 in the thickness direction (direction of x-axis in FIG. 3). The second electrode tabs 86 can be biasedly disposed in a different direction from that of the first electrode tabs 85. The second electrode tabs 86 can be disposed to face only a second surface 202 of the virtual reference plane L1 that passes through the center of the electrode assembly 80 in the thickness direction.

Thus, heat generating can be reduced, since the distance between the first electrode tabs and the second electrode tabs are further increased in the case that the first electrode tabs and the second electrode tabs are biasedly disposed in different directions with respect to the center of the electrode assembly in the thickness direction.

When a width of the first electrode tabs 85 is designated by TW1, a width of the second electrode tabs 86 is designated by TW2, a minimum distance between the first electrode tabs 85 and a lateral end of the electrode assembly 80 is designated by SW1, and a minimum distance between the second electrode tabs 86 and the lateral end of the electrode assembly 80 is designated by SW2, the distance TG between the first electrode tabs 85 and the second electrode tabs 86 satisfies following Equation 1.

$$1.2TW1<TG<6TW1,\ TG>5SW1 \qquad \text{Equation 1}$$

Further, the minimum distance SW1 between the first electrode tabs 85 and the lateral end of the electrode assembly 80 satisfies following Equation 2.

$$(1/20)*TW1<SW1<(3/4)*TW1 \qquad \text{Equation 2}$$

Herein, the distance TG between the first electrode tabs 85 and the second electrode tabs 86 is designated to a horizontal distance between the lateral end of the first electrode tabs 85 and the lateral end of the second electrode tabs 86.

Thus, according to the third exemplary embodiment, heat generated at the first electrode tabs 85 and the second electrode tabs 86 can be minimized by securing the sufficient distance between the first electrode tabs 85 and the second electrode tabs 86, while appropriately securing the width TW1 of the first electrode tabs 85.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:

an electrode assembly having a thickness and comprising a positive electrode and a negative electrode; and a case accommodating the electrode assembly, wherein the electrode assembly further comprises a plurality of first electrode tabs having the same width and protruding from the positive electrode and a plurality of second electrode tabs protruding from the negative electrode and not directly facing the first electrode tabs, wherein the first electrode tabs are aligned in the depth dimension of the electrode assembly, wherein a distance TG between the first electrode tabs and the second electrode tabs satisfies the following equations:

$$1.2TW1<TG<6TW1 \text{ and } TG>5SW1,$$

where TW1 is the width of the first electrode tabs and SW1 is the minimum distance between the first electrode tabs and a lateral end of the electrode assembly, and wherein the first and second electrode tabs are positioned to satisfy the equation of TG>5SW1 such that heat generated in the first and second electrode tabs is reduced and not to border or cross a virtual reference plane that passes through the center of the electrode assembly in the depth dimension.

2. The rechargeable battery of claim 1, wherein the minimum distance SW1 between the first electrode tabs and the lateral end of the electrode assembly satisfies the following equation:

$$(1/20)*TW1<SW1<(3/4)*TW1.$$

3. The rechargeable battery of claim 1, wherein the first and second electrode tabs protrude in the same direction.

4. The rechargeable battery of claim 1, wherein the width of the first electrode tabs is greater than the width of the second electrode tabs.

5. The rechargeable battery of claim 1, wherein the width of the first electrode tabs is from about 1.1 times to about 1.5 times greater than the width of the second electrode tabs.

6. The rechargeable battery of claim 1, wherein the rechargeable battery is configured to start an engine.

7. The rechargeable battery of claim 1, wherein the electrode assembly has a spirally wound structure in which a separator is interposed between the positive and negative electrodes.

8. The rechargeable battery of claim 1, wherein both of the first and second electrode tabs face only a first surface of the virtual reference plane.

9. The rechargeable battery of claim 1, wherein the first and the second electrode tabs are disposed in different directions with respect to the center of the electrode assembly in a thickness direction.

10. The rechargeable battery of claim 1, wherein the first electrode tabs face a first surface of the virtual reference plane, and wherein the second electrode tabs face a second surface of the virtual reference plane opposing the first surface.

11. The rechargeable battery of claim 1, wherein the first and second electrode tabs are positioned to satisfy the equation of TG>5SW1 such that heat generated in the first and second electrode tabs is minimized.

12. A rechargeable battery comprising:

an electrode assembly comprising a positive electrode, a negative electrode, a plurality of first electrode tabs having the same width and protruding from the positive electrode, and a plurality of second electrode tabs protruding from the negative electrode and not directly facing the first electrode tabs, wherein a distance (TG) between the first electrode tabs and the second electrode tabs satisfies the following equation:

$$1.2TW1<TG<6TW1$$

where TW1 is the width of the first electrode tabs and SW1 is the minimum distance between the first electrode tabs and a lateral end of the electrode assembly, and wherein the first and second electrode tabs are positioned to satisfy the, equation of TG>5SW1 such that heat generated in the first and second electrode tabs is reduced and not to border or cross a virtual reference plane that passes through the center of the electrode assembly in the depth dimension of the electrode assembly.

13. The rechargeable battery of claim 12, wherein the first and second electrode tabs have the same width.

14. The rechargeable battery of claim 12, wherein the first electrode tabs are wider than the second electrode tabs.

15. The rechargeable battery of claim 12, wherein the first electrode tabs are located closer to a front surface of the rechargeable battery than the second electrode tabs.

16. The rechargeable battery of claim 12, further comprising a case accommodating the electrode assembly.

17. A rechargeable battery comprising:

an electrode assembly comprising a positive electrode, a negative electrode, a plurality of first electrode tabs having the same width and protruding from the positive electrode, and a plurality of second electrode tabs protruding from the negative electrode and not directly facing the first electrode tabs, wherein a width (TG) between the first electrode tabs and the second electrode tabs satisfies the following equation:

$$1.2TW1<TG<6TW1$$

where TW1 is the width of the first electrode tabs and SW1 is the minimum distance between the first electrode tabs and a lateral end of the electrode assembly, wherein the first electrode tabs are wider than the second electrode tabs, and wherein the first and second electrode tabs are positioned to satisfy the equation of TG>5SW1 such that heat generated in the first and second electrode tabs is reduced and not to border or cross a virtual reference plane that passes through the center of the electrode assembly in the depth dimension of the electrode assembly.

18. The rechargeable battery of claim 17, wherein the width of the first electrode tabs is from about 1.1 times to about 1.5 times greater than the width of the second electrode tabs.

* * * * *